United States Patent Office 2,849,276
Patented Aug. 26, 1958

2,849,276
PREPARATION OF ALKALI METAL BOROHYDRIDES

Hugh J. Bronaugh, Chattanooga, Tenn., assignor, by mesne assignments, to Thiokol Chemical Corporation, a corporation of Delaware No Drawing. Application November 29, 1956
Serial No. 625,198

3 Claims. (Cl. 23—14)

This invention relates to a novel method for the preparation of metal borohydrides. More particularly, it relates to the formation of alkali metal borohydrides by the reaction of boron orthophosphate with alkali metal hydrides.

The alkali metal borohydrides are well known and very useful chemicals. They are efficient reducing agents in organic and analytical processes and can be used as hydrogen-generating compounds. These borohydrides can also be used as a source of diborane.

Borohydrides have been produced in a variety of ways. The most successful industrial preparation for the production of the alkali metal borohydrides involves the reaction of an alkali metal hydride with an alkyl borate, particularly trimethylborate, as is described in Schlesinger's U. S. Patent 2,534,533. This reaction is conducted at elevated temperatures and necessitates the use of pressures to maintain the methyl borate in the liquid phase. At low temperatures and pressures yields are poor. Furthermore, methyl borate hydrolyzes in air and thus requires special handling. In addition, various by-products are formed including alkali metal tetraoxyborohydrides and alkali metal trimethoxyborohydrides. The largest by-product is sodium methoxide, of which theoretically 162 pounds is produced to every 38 pounds of sodium borohydride formed. Sodium methoxide is not readily disposable on the commercial market nor is it easily converted into a commercially valuable product.

An object of this invention is to provide a method of preparing alkali metal borohydrides which utilizes potentially available and cheap reactants that are stable in air in an easily performable reaction which does not require the use of pressure. Boron orthophosphate is such a reactant. It can be easily prepared by evaporating mixtures of boric and phosphoric acids and heating the residue. Boron orthophosphate can also be made by reacting phosphorus pentoxide with molten boric oxide in accordance with the method taught in Kamlet's U. S. Patent 2,646,344.

Another object of this invention is to provide a method of producing the alkali metal borohydrides in which no boron is lost in the formation of by-products and which produces commercially valuable by-products. For example, trisodium phosphate, the principal by-product of the reaction when sodium borohydride is produced, is useful as a detergent, a water softener, a boiler compound, and is readily disposable on the commercial market.

Other objects and advantages of the invention will appear as the description thereof proceeds.

The process of the present invention comprises the reaction of boron orthophosphate with an alkali metal hydride in accordance with the equation:

$$BPO_4 + 4MH \rightarrow MBH_4 + M_3PO_4$$

in which M represents a metal of the alkali metals group, for example, lithium, sodium or potassium.

The reactants are intimately mixed by a stirring apparatus in the presence of a liquid petroleum fraction boiling above the kerosene range, such as gas oil, or lubricating oil such as light automotive engine oil, heavy automotive engine oil, white oil and so forth. The reaction does not proceed successfully when the constituents are in a dry state. Approximately theoretical weights of the starting reactants as set forth by the preceding equation are used although these can be varied as much as 50% or more from the theoretical weights.

The reaction is conducted by heating the mixture at a temperature ranging from 200° to 400° C. from 20 minutes to 2 hours or more. During the reaction the slurry of reactants is kept from contacting the air by an inert gaseous medium such as nitrogen. Volatile ingredients are condensed and returned to the system during the reaction, by a refluxing system such as a reflux condenser.

After heating for the prescribed length of time the apparatus is cooled and the inert reaction media separated from the other reactants by a process such as centrifugation. The remaining solids can then be washed free of the inert reaction medium by a suitable solvent, if desired. When white oil is used, petroleum ether is an excellent solvent.

The borohydride can then be extracted from the residue by mixing the residue with a suitable solvent to dissolve the borohydride, separating the borohydride-rich solvent from the remaining residue and then evaporating the solvent. Liquid ammonia or a suitable amine such as trimethylamine or triethylamine is a satisfactory solvent. Evaporation of the solvent then yields the crystalline metal borohydride.

The following example is intended only to illustrate the mode of practicing the invention, without in any way limiting such practice.

Example 1

1.7 gram mole of sodium hydride and 0.57 gram mole of boron orthophosphate were placed in a 500 ml., three-necked flask. 200 ml. of white mineral oil (trade name: Nujol) was added to make a slurry of the reactants. The reaction flask was fitted with a high speed stirring mechanism, a thermometer well and a reflux condenser. After the reaction flask had been purged with nitrogen the temperature was increased, first to 280° C. for 40 minutes, and then to 300° C. for 80 minutes while maintaining a high speed stirring throughout. The reaction mixture was cooled to room temperature; the residue was then isolated by centrifugation and extracted with 200 ml. of liquid ammonia. The evaporation of the ammonia extract yielded a crystal-like compound which was identified by wet chemical analysis as sodium borohydride. The corrected yield of sodium borohydride, based upon the postulated equation, was 5 percent. Analytical data for the ammonia-insoluble and ammonia-soluble products are summarized as follows:

| Ammonia-insoluble residue (109 g.) | Ammonia-soluble solids (0.2 g.) |
|---|---|
| H*=13.2 mmoles/g. <br> B=6.96 mmoles/g. <br> H/B=1.9 | H*=78.0 mmoles/g. <br> B=20.1 mmoles/g. <br> H/B=3.99 |

*Hydrogen evolved upon hydrolysis.

I have also discovered that various other materials which are inert under the reaction conditions can be employed in place of the liquid petroleum fraction boiling above the kerosene range. Such materials have boiling points at atmospheric pressure of at least 200° C., and among them are hexachlorobenzene, and fluorocarbons such as perfluoro-n-hexadecane ($C_{16}F_{34}$), perfluoroanthracene ($C_{14}F_{24}$), perfluorophenanthrene ($C_{14}F_{24}$), and perfluoro-fluoranthene ($C_{16}F_{26}$).

I claim:

1. A method for the production of an alkali metal borohydride which comprises reacting an alkali metal hydride and boron orthophosphate at 200° C. to 400° C. while the reactants are in admixture with an inert liquid petroleum fraction boiling above the kerosene range and recovering the alkali metal borohydride from the reaction mixture.

2. The method of claim 1 wherein the alkali metal hydride is sodium hydride.

3. The method of claim 2 wherein the liquid petroleum fraction is white mineral oil References Cited in the file of this patent

UNITED STATES PATENTS 2,720,444 Banus et al. _____ Oct. 11, 1955

OTHER REFERENCES

Schechter et al.: "Boron Hydrides and Related Compounds," page 51 (Jan. 8, 1951), declassified Jan. 5, 1954, Dept. of Navy, Bureau of Aeronautics.

Hurd: "Chemistry of the Hydrides," pages 33, 34 (1952).